United States Patent [19]

Pailthorp et al.

[11] Patent Number: 4,941,082
[45] Date of Patent: Jul. 10, 1990

[54] LIGHT BEAM POSITIONING SYSTEM

[75] Inventors: Robert M. Pailthorp, Portland; Howard V. Goetz, Sherwood; Mark A. Bortnem, Newberg; Bruce E. Edson, Beaverton, all of Oreg.

[73] Assignee: Electro Scientific Industries, Inc., Portland, Oreg.

[21] Appl. No.: 185,414

[22] Filed: Apr. 25, 1988

[51] Int. Cl.⁵ ..................... G06F 15/46; G01C 25/00
[52] U.S. Cl. ..................... 364/167.01; 219/121.78; 318/640; 364/571.04
[58] Field of Search ......... 364/167.01, 571.01–571.08, 364/559; 346/108, 109; 219/121.78–121.82; 369/44, 45; 250/491.1; 318/640; 350/6.5; 356/123, 375, 399

[56] References Cited

U.S. PATENT DOCUMENTS

| | | | |
|---|---|---|---|
| 4,584,455 | 4/1986 | Tomizawa | 219/121.78 X |
| 4,626,649 | 12/1986 | Dupeyrat et al. | 219/121 LU |
| 4,641,071 | 2/1987 | Tazawa et al. | 318/640 |
| 4,711,573 | 12/1987 | Wijntjes et al. | 318/640 X |
| 4,791,591 | 12/1988 | Asanuma et al. | 364/571.04 |
| 4,812,726 | 3/1989 | Benii et al. | 318/640 |

FOREIGN PATENT DOCUMENTS

| | | |
|---|---|---|
| 0147525 | 7/1985 | European Pat. Off. |
| 0199650 | 10/1986 | European Pat. Off. |
| 58-224088 | 4/1984 | Japan |
| 61-123492 | 10/1986 | Japan |

OTHER PUBLICATIONS

Teradyne M218 Memory Repair System, p. 5, 1984.

Daniel Winkler, "Status quo beim Laserbeschriften", *Techica*, No. 37, 2/1988, pp. 54–56.

*Primary Examiner*—Joseph Ruggiero
*Attorney, Agent, or Firm*—Stoel Rives Boley Jones & Grey

[57] ABSTRACT

A light beam positioning system (10) has the capability of generating accurately positioned beam paths at programmed velocities between any two positions on a target surface (18). The beam positions correspond to beam position and velocity command data processed by a system control computer (22). The invention employs an error correction processor (52) that receives X and Y position coordinate signals (X and Y signals) produced by a conventional position data generator and develops compensated X and Y position coordinate signals ($X_c$ and $Y_c$ signals) for delivery to a light beam positioner (12). The $X_c$ and $Y_c$ signals are derived from a calibration map of an addressable field representing the positions to which the light beam can be commanded on the target surface. The $X_c$ and $Y_c$ signals represent polynominal functions of the X and Y signals and offset beam position errors resulting from the light-directing properties of the system optical components (26, 28, 30). The error correction processor allows the use of a single command data file in the system control computer, which is capable of controlling different systems of the same model type. This can be accomplished simply by loading the error correction processor with the pertinent field correction coefficients to the particular light beam positioner in use. Such flexibility is achievable with no changes to software files in the system control computer.

15 Claims, 6 Drawing Sheets

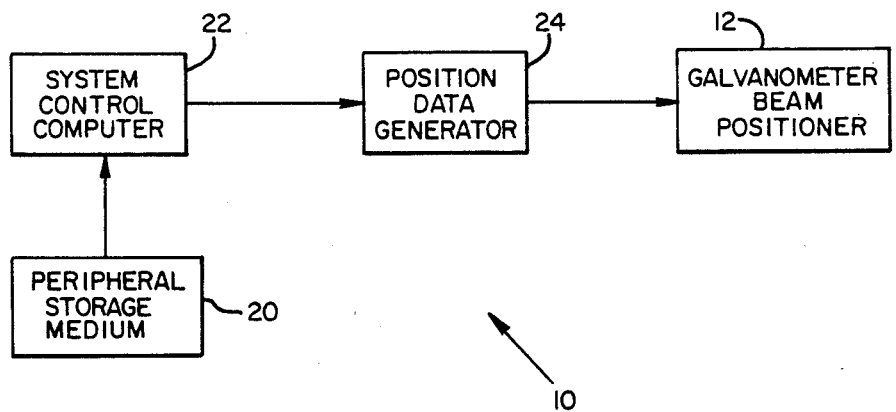
FIG. 1A (Prior Art)
FIG. 1B (Prior Art)
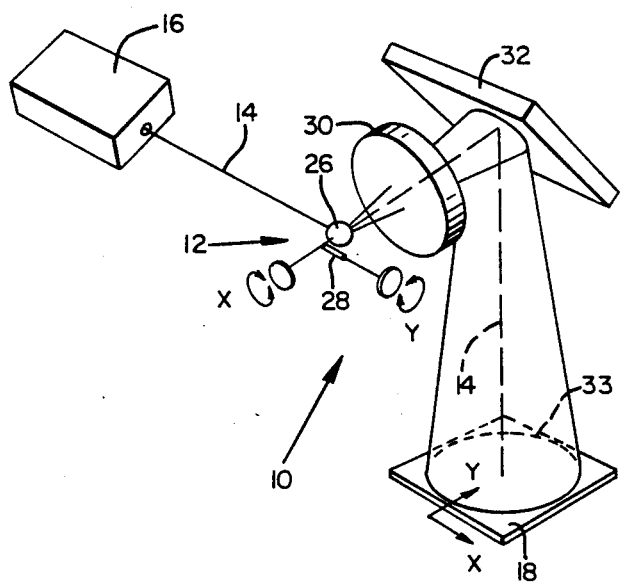

FIG. 5
```
IX1,IY1        IX2,IY2         IX3,IY3
               IX4,IY4
IX5,IY5  IX6,IY6  IX7,IY7  IX8,IY8  IX9,IY9
               IX10,IY10
IX11,IY11      IX12,IY12       IX13,IY13
```
FIG. 6A
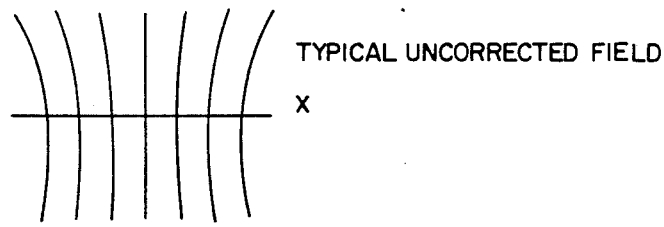
TYPICAL UNCORRECTED FIELD
FIG. 6B
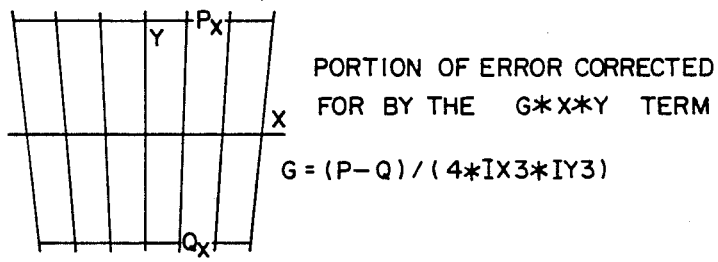
PORTION OF ERROR CORRECTED FOR BY THE G*X*Y TERM
G = (P−Q) / (4*IX3*IY3)
FIG. 6C
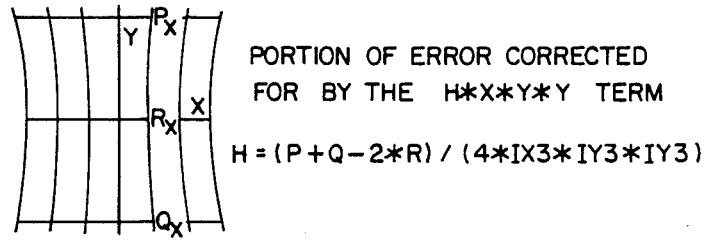
PORTION OF ERROR CORRECTED FOR BY THE H*X*Y*Y TERM
H = (P+Q−2*R) / (4*IX3*IY3*IY3)

120

LIGHT BEAM POSITIONING SYSTEM

TECHNICAL FIELD

The present invention relates to light beam positioning systems and, in particular, to such a system having light beam position error correction capabilities.

BACKGROUND OF THE INVENTION

A conventional automated light beam positioning system typically includes a light beam positioner and a system control computer. The light beam positioner, which typically includes optical components having movable light-directing surfaces, receives beam position and velocity command data ("command data") processed by the system control computer. The optical components have either reflective or refractive light-directing properties. The light beam positioner determines, in response to the command data, the propagation path of an incident light beam to direct it to a predetermined position on a workpiece.

To change the path the light beam travels along the workpiece, the light beam positioner changes, in response to different command data, the orientations of the movable light-directing surfaces of the optical components. One example of such a device is a galvanometer beam positioner, which employs a pair of selectively pivotable mirrors that cooperate in response to the command data to direct an incident light beam to a desired position on a target surface.

FIGS. 1A and 1B are diagrams of a prior art light beam positioning system 10 that employs a galvanometer beam positioner 12 to direct an incident light beam 14 emanating from a laser source 16 to a desired position on a planar target surface 18. FIG. 1A is a block diagram of the data processing modules for controlling galvanometer beam positioner 12, and FIG. 1B is a pictorial diagram of the optical components of light beam positioning system 10.

With reference to FIGS. 1A and 1B, a peripheral storage medium 20, such as a magnetic disk, provides the command data to a system control computer 22. System control computer 22 typically performs multiple tasks, at least some of which do not pertain to a light beam positioning operation. The command data represent "tables" of start and end positions of possible paths and their associated speeds of light beam travel along the workpiece. System control computer 22 acquires electrical measurement data and, in response to such data, selects one of each of the possible paths and speeds for the light beam. For example, command data for a laser-based resistor trimmer represents a series of respective start and end positions from which and to which laser beam 14 moves to carry out a trimming operation on a particular resistor network with a known pattern.

System control computer 22 delivers the command data to a position data generator 24, which develops an X position coordinate digital word signal ("X signal") and a Y position coordinate digital word signal ("Y signal"). The X and Y signals represent digital words that are converted to DC voltages that are delivered to different ones of two galvanometer motors (not shown). A galvanometer motor is a DC motor whose shaft is operatively connected to a mirror for movement about a pivot axis. Galvanometer beam positioner 12 employs a pair of separate mirrors 26 and 28 mounted to brackets that are operatively connected to the galvanometer motors for pivotal movement about orthogonally aligned pivot axes. Mirrors 26 and 28 receive the incident laser beam 14 and pivotally move about their respective pivot axes in response to the X and Y signals to direct beam 14 to a desired position on target surface 18. Galvanometer beam positioner 12 also includes a lens of the F-Θ type for focusing beam 14 and a mirror 32 for directing beam 14 toward target surface 18. The pivotal movements of mirrors 26 and 28 describe a generally circular addressable imaging area 33 on target surface 18.

One of the problems associated with light beam positioning system 10 is that the system optical components can cause unit pivotal movements of the galvanometer mirrors to not result in unit linear movements of laser beam 14 on target surface 18. A primary source of such nonlinear beam movement is the nonlinear distortion that results whenever the system optical components inaccurately convert pivotal motion to linear motion. For example, whenever it is positioned off the optic axis, galvanometer mirror 26 misdirects beam 14 as it propagates toward galvanometer mirror 28 and lens 30. The introduction of such optical distortion results in "pincushion" distortion, which represents nonequidistant spacing between adjacent positions near the periphery of target surface 18 as beam 14 moves toward them in response to corresponding unit angular displacements of galvanometer mirrors 26 and 28.

FIG. 2 is a map of an exemplary addressable field 34 showing the light beam grid pattern described on target surface 18 by unit angular displacements of galvanometer mirrors 26 and 28 in response to unit changes in command data position values. For purposes of the following description, galvanometer mirrors 26 and 28 pivotally move about the X and Y axes, respectively. FIG. 2 shows that addressable field 34 of target surface 18 is of pincushion shape with equidistant spacing of 2.5 mm between adjacent positions in the vicinity of the center 36 of the target surface, an outwardly directed contour with a "keystone" shape at the periphery portions 40 in the X direction, and an inwardly directed contour at the periphery portions 38 in the Y direction. The resulting beam positioning nonlinearity is typically a few percent near the periphery of the target surface.

There are several techniques employed in an attempt to deal with the nonlinear beam positioning introduced by the galvanometer beam positioner optical components. One technique is simply to ignore the problem and tolerate the resulting pincushion distortion. A second technique entails visual feedback in which an operator uses a joystick manually to position the laser beam at the desired start position. This technique suffers from the obvious disadvantage of being labor intensive and does not correct the problem of positioning nonlinearity that occurs as the laser beam moves from a start position near the periphery of the target surface. The use of visual feedback to direct the laser beam in the correct start position cannot, therefore, result in straight line beam positioning along the target surface.

A third technique for correcting beam positioning errors entails correcting the command data processed by system control computer 22. This is accomplished by providing in the system control computer 22 a calibration map in the form of a look-up table having correction data corresponding to the desired target surface positions to which the command data correspond. System control computer 22 uses the correction data to modify the command data to eliminate beam position errors. This error correction technique is disadvantageous because software files located in system control computer 22 must be changed each time a different beam positioner 12 is used in conjunction with system control computer 22. Another disadvantage is that the system control computer response time to a change in command data is inherently long because system control computer 22 performs many other unrelated tasks that are assigned priorities. The desired change in beam position may take place, therefore, after significant time has elapsed from the receipt of command data.

SUMMARY OF THE INVENTION

An object of the invention is, therefore, to provide a beam position error correcting light beam positioning system.

Another object of the invention is to provide such a system that performs beam position error correction in real time.

A further object of the invention is to provide such a system that does not necessitate changes in system control computer software files with the use of different light beam positioners.

Still another object of the invention is to provide a computer-controlled light beam positioning system that has good beam positioning linearity properties over the entire addressable imaging area of a target surface.

Yet another object of the invention is to provide such a system that employs a galvanometer light beam positioner.

The present invention is described only by way of example with reference to a laser-based resistor trimmer system that employs a galvanometer laser beam positioner. The invention corrects in real time positioning errors of a galvanometer laser beam positioner and, therefore, has the capability of generating accurately positioned straight lines at programmed velocities between any two points on a target surface.

The invention employs an error correction processor that receives the X signal and the Y signal produced by a conventional position data generator and develops a compensated X digital word signal ("$X_c$ signal") and a compensated Y digital word signal ("$Y_c$ signal"), respectively, for delivery to the galvanometer beam positioner. The use of the error correction processor in association with the position data generator and the galvanometer beam positioner allows the use of common trim position data files in the system control computer in systems capable of using different light beam positioners. A facility having multiple computer-controlled beam positioning systems implemented in accordance with the invention is, therefore, capable of processing the same resistor network workpiece on different beam positioning systems having the same command data in the system control computer.

The error correction processor performs the correction steps in real time, thereby providing the $X_c$ and $Y_c$ signals in less time than the response time of the pivotally movable galvanometer mirrors of the light beam positioner. The error correction processor can be adapted for use in different laser trimming systems of the same model type simply by loading the error correction processor with the pertinent correction factors for the particular light beam positioner in use. Such flexibility is achievable with no changes to the software files in the system control computer.

Additional objects and advantages of the present invention will be apparent from the detailed description of a preferred embodiment thereof, which proceeds with reference to the accompanying drawings.

BRIEF DESCRIPTION OF THE DRAWINGS

FIGS. 1A and 1B are respective block and pictorial diagrams of a prior art computer-controlled beam positioning system.

FIG. 5 is a diagram showing the locations of thirteen calibration points used in deriving the field correction coefficients in accordance with the flow diagram of FIG. 4.

FIG. 6A shows pincushion distortion in the X-direction only of an addressable field pattern of the character shown in FIG. 2, and FIGS. 6B and 6C represent the wedge shape component and parabolic shape component, respectively, that can be superimposed to form the addressable field pattern of FIG. 6A.

DETAILED DESCRIPTION OF PREFERRED EMBODIMENT

Figure 3:
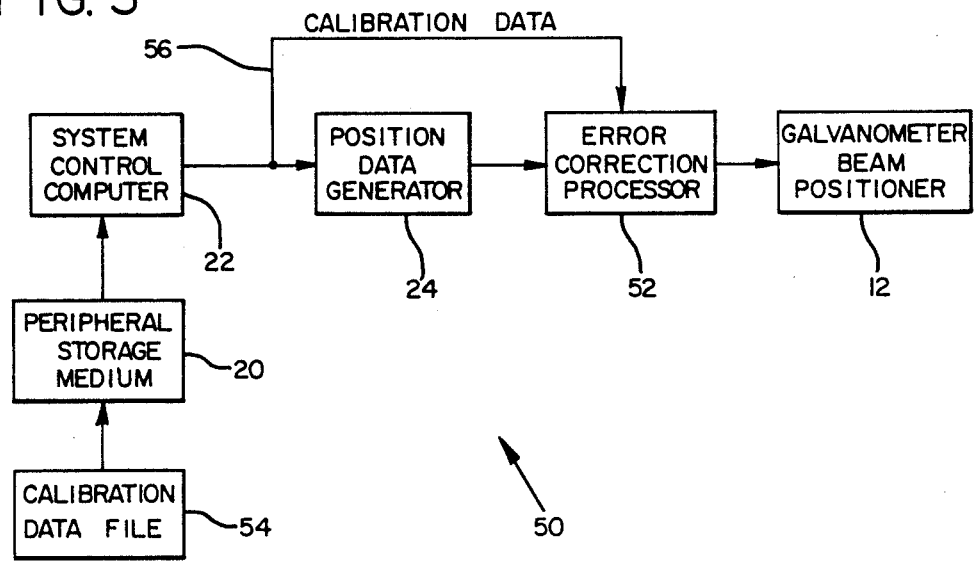
FIG. 3 is a block diagram of a computer-controlled light beam positioning system with beam position error correction in accordance with the present invention.

FIG. 3 is a block diagram of a computer-controlled light beam positioning system 50 with beam position error correction in accordance with the present invention. Beam positioning system 50 is described herein only by way of example as having a galvanometer laser beam positioner 12 of the type typically employed in resistor trimming systems. Beam positioning system 50 is capable of correcting laser beam positioning errors introduced by different galvanometer laser beam positioners 12 of the same model type. This can be accomplished by providing to an error correction processor 52 a set of correction coefficients that characterize the light directing properties of the specific galvanometer beam positioner employed in the beam positioning system. Beam positioning system 50 is capable of correcting for errors resulting from (1) nonlinear distortion caused by mirror pivotal motion and lens characteristics, (2) alignment errors caused by a deviation from orthogonal relationship of the X-Y coordinate axes, (3) scale factor and origin deviation errors for the X-axis and Y-axis, and (4) rotational misalignment of the imaging field with respect to the target surface 18. In a preferred embodiment, target surface 18 is planar and represents the working surface of any laser-based micromachining device.

With reference to FIG. 3, beam positioning system 50 differs in part from the prior art beam positioning system 10 in that the former includes an error correction processor 52 that is positioned between position data generator 24 and galvanometer beam positioner 12. Error correction processor 52 executes a correction formula the results of which are inscribed in a memory to calculate the $X_c$ and $Y_c$ signals for delivery to galvanometer beam positioner 12. The error correction processor 52 performs the corrections in real time during the laser trimming operation. Error correction processing is performed at least as quickly as the response time of the galvanometer mirror that is driven.

Corrections to the command data are implemented in software whose processing steps manipulate the terms in predetermined equations representing the $X_c$ and $Y_c$ signals. These equations correct for position errors in each of the X- and Y-axes for each command data point. The equations are matched to a particular beam positioner 12 by means of a calibration process that generates a specific set of field correction coefficients ("coefficients") for the terms in the equations.

The calibration process that generates the coefficients is executed only as required to compensate for long term system drift or changes resulting from adjustment or repair. The coefficients are stored in a calibration data file 54 that is used in data communication with system control computer 22 and are delivered by way of a data bus 56 to error correction processor 52 each time electrical power is applied to beam positioning system 50. The contents of calibration data file 54 are identified by the serial number of the particular beam positioning system 50 to ensure that the correct set of coefficients is associated with the galvanometer beam positioner 12 employed in such system. It will be appreciated that the coefficients could also be stored in a nonvolatile memory in direct data communication with error correction processor 52.

Error correction processor 52 receives the X and Y signals representing a command data point and performs the pertinent mathematical operations to calculate the $X_c$ and $Y_c$ signals in accordance with the following transform equations:

$$X_c = A_1 + B_1 X + C_1 X^2 + D_1 X^3 + E_1 Y + F_1 Y^2 + G_1 XY + H_1 XY^2$$

$$Y_c = A_2 + B_2 Y + C_2 Y^2 + D_2 Y^3 + E_2 X + F_2 X^2 + G_2 YX + H_2 YX^2,$$

where $A_1$, $B_1$, $C_1$, $D_1$, $E_1$, $F_1$, $G_1$, and $H_1$ and $A_2$, $B_2$, $C_2$, $D_2$, $E_2$, $F_2$, $G_2$, and $H_2$ represent the coefficients. The coefficients are derived from a set of measured data obtained from scans of the workpiece at thirteen predetermined locations in an addressable field bounded by a rectangle.

Figure 4:
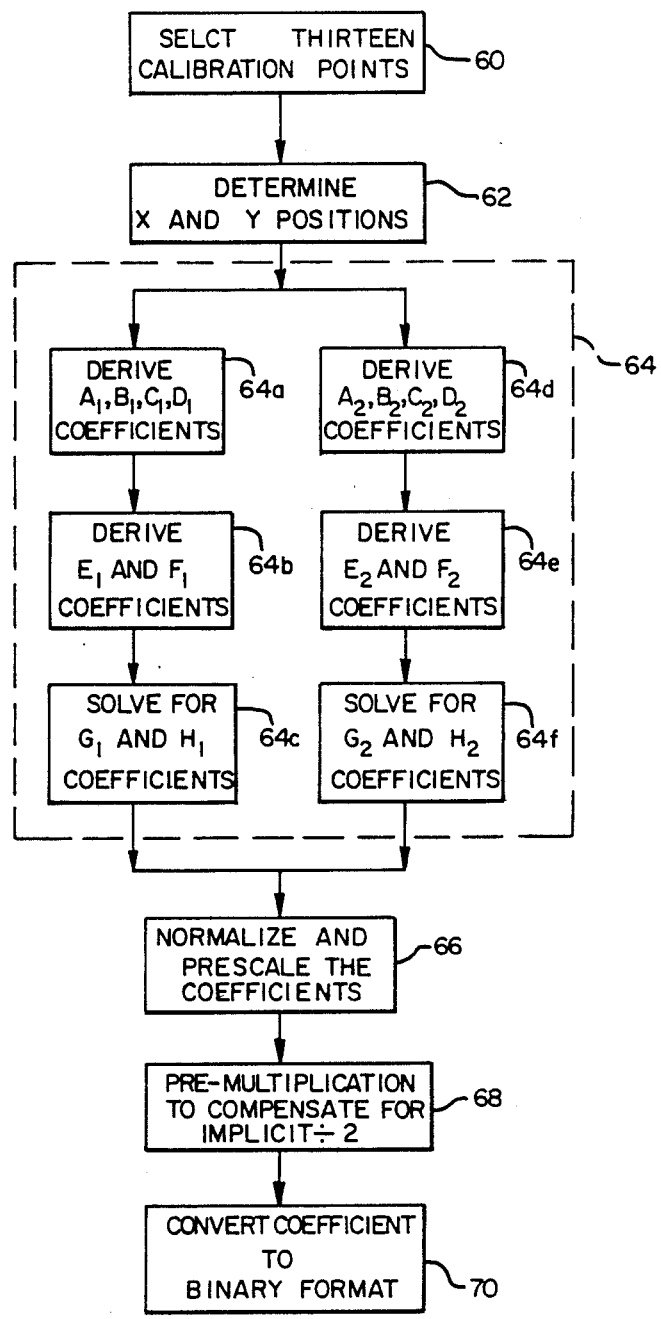
FIG. 4 is a flow diagram of the calibration processing steps carried out to derive field correction coefficients of the polynomial terms representing the $X_c$ and $Y_c$ signals.

FIG. 4 is a flow diagram showing the calibration processing steps for deriving the coefficients for the $X_c$ and $Y_c$ signals. The calibration process entails six principal processing steps, which include (1) selecting a regular array of thirteen calibration points centered in the addressable field, (2) determining the command data required to the laser beam precisely at each one of the thirteen selected calibration points, (3) deriving the sixteen required coefficients $A_1$–$H_1$ and $A_2$–$H_2$ for the respective transform equations $X_c$ and $Y_c$, (4) normalizing and scaling the derived coefficients to prevent numeric overflow in a 16-bit integer mathematical operation carried out by error correction processor 52, (5) adjusting certain ones of the coefficients to compensate for an inherent divide-bytwo operation performed whenever a multiplication operation is carried out, and (6) converting the coefficients to fractional binary format. The following detailed explanation of each of the above six steps is given with reference to FIG. 4.

Process block 60 indicates the selection of the thirteen calibration points. Each of the calibration points is bounded by a rectangle whose borders are about 5 percent inside the limits of the addressable field so that centering errors and aberrations caused by pincushion distortion do not place any of the calibration points outside the addressable field. The calibration points are referred to herein as "independent variables" for substitution into the $X_c$ and $Y_c$ equations and are arranged in thirteen ordered pairs denominated $(IX_1, IY_1)$ through $(IX_{13}, IY_{13})$ For example, $IX_1$ and $IY_1$ represent the respective X-coordinate and the Y-coordinate of calibration point 1.

FIG. 5 is a diagram showing the locations of the thirteen field calibration points identified in accordance with the above-described notation. Each increment of the galvanometer motors for galvanometer mirrors 26 and 28 represents, for example, 0.0025 millimeter movement of the laser beam along either the X-axis or the Y-axis of the target surface. The size of incremental movement depends upon the particular implementation of galvanometer beam positioner 12. The galvanometer motor counts are computed with reference to the center point $(IX_7, IY_7)$ of the addressable field.

The thirteen calibration points include five points positioned along the horizontal ($Y=0$) axis, centered on $X=0$, and spaced according to the approximate proportions $-10, -6, 0, 6, 10$; five points positioned along the vertical ($X=0$) axis, centered on $Y=0$ and spaced according to the approximate proportions $-10, -6, 0, 6, 10$; and four corner points of the rectangle, which in the preferred embodiment is a square. In particular, the five points positioned along the horizontal axis include the ordered pairs $(IX_5, IY_5)$, $(IX_6, IY_6)$, $(IX_7, IY_7)$, $(IX_8, IY_8)$, and $(IX_9, IY_9)$. The five points positioned along the vertical axis include the ordered pairs $(IX_2, IY_2)$, $(IX_4, IY_4)$, $(IX_7, IY_7)$, $(IX_{10}, IY_{10})$, and $(IX_{12}, IY_{12})$. The four corner points of the square include the ordered pairs $(IX_1, IY_1)$, $(IX_3, IY_3)$, $(IX_{11}, IY_{11})$, and $(IX_{13}, IY_{13})$. It will be appreciated that the center point $(IX_7, IY_7)$ is common to the two sets of five points positioned along the horizontal and vertical axes.

Process block 62 indicates the determination of the X and Y signals required to position laser beam precisely at each one of the thirteen calibration points established in the manner described with reference to process block 60. The measurement can be accomplished, for example, by means of a scanning routine that locates a target, which represents any one of the thirteen calibration points. The targets can be either thirteen target locations on a fixed calibration plate or a single target location on a plate movable to thirteen different positions by a step-and-repeat mechanism. The thirteen measured positions are referred to herein as the "dependent variables" for substitution into the $X_c$ and $Y_c$ transform equations and are denominated $(DX_1, DY_1)$ through $(DX_{13}, DY_{13})$ For example, $DX_1$ and $DY_1$ represent the respective X and Y signals delivered to error correction processor 52 to position the beam at the center of target 1, which is located at $(IX_1, IY_1)$.

Process block 64 indicates the derivation of the coefficients from the independent variables IX and IY and the dependent variables DX and DY. The process of deriving all of the coefficients from the independent and dependent variables entails six substeps, some of which requiring the use of a conventional least-squares curve fitting algorithm. The requirements of the algorithm are that it (1) be sufficiently accurate to maintain at least six significant digits of resolution for floating point numbers as small as $1 \times 10^{-12}$, (2) be capable of fitting selectively either a second or third order curve to five calibration points, and (3) generate the desired coefficients and a figure of merit indicative of the quality of fit obtained. The figure of merit is useful for error checking purposes.

Substep 64a indicates the derivation of the $A_1$, $B_1$, $C_1$, and $D_1$ coefficients. This derivation is accomplished by solving the $X_c$ transform equation as a function of X. The $A_1$, $B_1$, $C_1$, and $D_1$ coefficients are derived from the five calibration points located along the horizontal or $Y = 0$ axis and is accomplished by performing a third order polynomial least-squares curve fit to the variables $IX_5$ and $DX_5$, $IX_6$ and $DX_6$, $IX_7$ and $DX_7$, $IX_8$ and $DX_8$, and $IX_9$, and $DX_9$. The coefficients derived from the least-squares curve fit are such that the zero order coefficient becomes $A_1$, which is equivalent to the X-axis offset; the first order coefficient becomes $B_1$, which is equivalent to the X-axis scale factor; the second order coefficient becomes $C_1$; and the third order coefficient becomes $D_1$. It will be appreciated that the zero order coefficient, which represents the X-axis offset, should equal the dependent variable $DX_7$. A difference between $A_1$ and $DX_7$ of greater than about five galvanometer motor increments could be indicative of questionable data.

Substep 64b indicates the derivation of the $E_1$ and $F_1$ coefficients. This derivation is accomplished by solving the $X_c$ transform equation as a function of Y. The $E_1$ and $F_1$ coefficients are derived from the five calibration points located along the vertical or $X = 0$ axis by performing a second order polynomial least-squares fit to the variables $IY_{12}$ and $DY_{12}$, $IY_{10}$ and $DY_{10}$, $IY_7$ and $DY_7$, $IY_4$ and $DY_4$, and $IY_{12}$ and $DY_2$. The coefficients derived from the second order polynomial least-squares curve fit are such that the zero order coefficient is unused except for error checking purposes, the first order coefficient becomes $E_1$, and the second order coefficient becomes $F_1$. It will be appreciated that the zero order coefficient should be approximately equal to $DX_7$ and to the $A_1$ coefficient. The difference between the otherwise unused zero order coefficient and $A_1$ (or $DX_7$) of greater than about five galvanometer motor increments again could be indicative of questionable data.

Substep 64c indicates the computation of the $G_1$ and $H_1$ coefficients. The $G_1$ and $H_1$ coefficients are derived directly from six of the measured values in accordance with the following equations:

$$P_x = DX_3 - DX_1$$

$$Q_x = DX_{13} - DX_{11}$$

$$R_x = DX_9 - DX_5,$$

where $P_x$, $Q_x$, and $R_x$ are nominally positive numbers approximately equal to the horizontal width of the data field. The $G_1$ and $H_1$ coefficients can be computed from the above expressions for $P_x$, $Q_x$, and $R_x$ as follows:

$$G_1 = (P_x - Q_x)/(4 \times IX_3 \times IY_3)$$

$$H_1 = (P_x + Q_x - 2 \times R_x)/(4 IX_3 \times IY_3 \times IY_3).$$

The $G_1$ coefficient can be of positive or negative value, and the magnitude of $G_1$ will be typically less than $1 \times 10^{-8}$. The $H_1$ coefficient will always be positive, and the magnitude of $H_1$ will be typically about $5 \times 10^{11}$.

Figure 2:
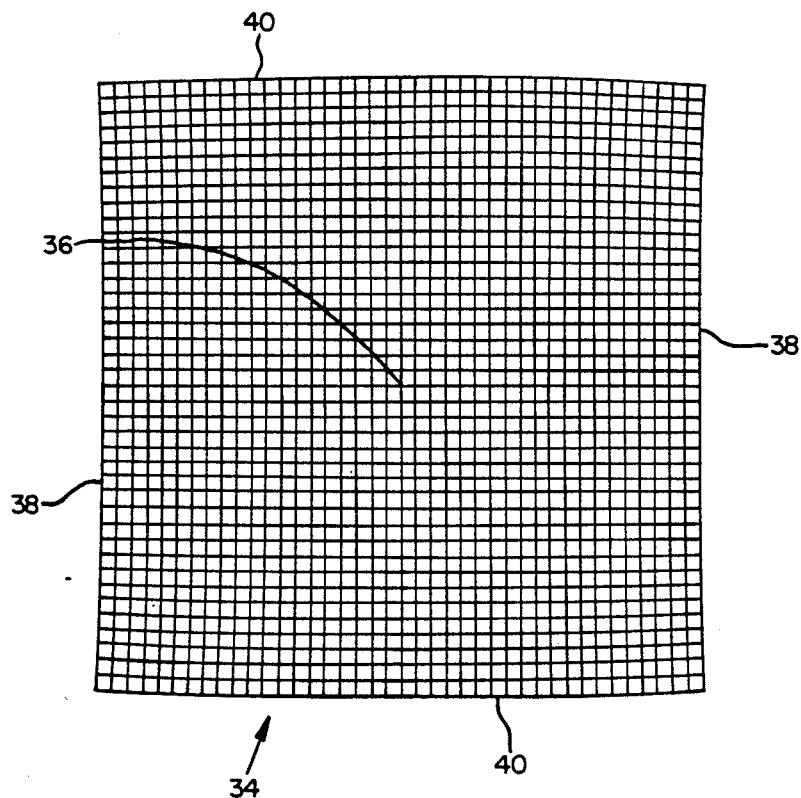
FIG. 2 is a map of an exemplary addressable field having the beam position pincushion distortion inherent in an error uncompensated prior art galvanometer beam positioning system of the type shown in FIGS. 1A and 1B.

The equations for the $G_1$ and $H_1$ coefficients are empirically derived from the addressable field pattern having pincushion distortion. FIG. 6A represents an enlarged portion of an uncorrected addressable field pattern of the character shown in FIG. 2. FIG. 6A shows pincushion distortion only in the X direction. During his formulation of the error correction transform equations, one of the inventors determined that the pattern of FIG. 6A can be represented as the superposition of a wedge shape component, which is shown in FIG. 6B, and a parabolic shape component, which is shown in FIG. 6C. FIG. 6B indicates that the wedge increases in angular displacement as a function of distance from the Y-axis, and FIG. 6C indicates that the parabolic curvature increases as a function of distance from the Y-axis.

The term $G_1XY$ in the $X_c$ transform equation corrects for the wedge shape shown in FIG. 6B. The term $(P_x - Q_x)$ of the $G_1$ coefficient represents four times the average X-axis component of the lines extending from the X-axis to points $(DX_1, DY_1)$, $(DX_3, DY_3)$, $(DX_{11}, DY_{11})$, and $(DX_{13}, DY_{13})$. The division by four in the $G_1$ equation is, therefore, required to calculate $G_1$. The $G_1$ coefficient is computed at the point $(IX_3, IY_3)$ because it resides in the first quadrant of the addressable field, but the point $(IX_1, IY_1)$ could also be used.

The term $H_1XY^2$ in the $X_c$ transform equation corrects for the parabolic shape, the term $(P_x + Q_x - 2 \times R_x)$ of the $H_1$ coefficient represents four times the X-axis component of parabolas at the points $(DX_1, DY_1)$, $(DX_3, DY_3)$, $(DX_{11}, DY_{11})$, and $(DX_{13}, DY_{13})$. One of the parabolas passes through the points $(DX_1, DY_1)$, $(DX_5, DY_5)$, and $(DX_{11}, DY_{11})$; and the other parabola passes through the set of points $(DX_3, DY_3)$, $(DX_9, DY_9)$, and $(DX_{13}, DY_{13})$.

The division by four in the $H_1$ equation is, therefore, required to calculate $H_1$. The $H_1$ coefficient is computed at the point $(IX_3, IY_3)$ because it resides in the first quadrant, but the points $(IX_1, IY_1)$, $(IX_{11}, IY_{11})$, and $(IX_{13}, IY_{13})$ could also be used. It will be appreciated that the terms $G_1XY$ and $H_1XY^2$ nonlinearly increase as the beam position moves away from the Y-axis.

Substep 64d indicates the derivation of the $A_2$, $B_2$, $C_2$, and $D_2$ coefficients. This derivation is accomplished by solving the $Y_c$ transform equation as a function of the Y terms in it. The $A_2$, $B_2$, $C_2$, and $D_2$ coefficients are derived from the five calibration points located on the vertical or $X = 0$ axis and is accomplished by performing a third order polynomial least-squares curve fit to the variables $IY_{12}$ and $DY_{12}$, $IY_{10}$ and $DY_{10}$, $IY_7$ and $DY_7$, $IY_4$ and $DY_4$, and $IY_2$ and $DY_2$. The coefficients derived from the least-squares curve fit are such that the zero order coefficient becomes $A_2$, which is equivalent to the Y-axis offset; the first order coefficient becomes $B_2$, which is equivalent to the Y-axis scale factor; the second order coefficient becomes $C_2$; and the third order coefficient becomes $D_2$. It will be appreciated that the zero order coefficient, which represents Y-axis offset, should equal the dependent variable $DY_7$. A difference between $A_2$ and $DY_7$ of greater than about five galvanometer motor increments could be indicative of questionable data.

Substep 64e indicates the derivation of the $E_2$ and $F_2$ coefficients. This derivation is accomplished by solving the $Y_c$ transform equation as a function of the X terms in it. The $E_2$ and $F_2$ coefficients are derived from the five calibration points located along the horizontal or $Y=0$ axis by performing a second order polynomial least-squares fit to the variables $IX_5$ and $DY_5$, $IX_6$ and $DY_6$, $IX_7$ and $DY_7$, $IX_8$ and $DY_8$, and $IX_9$ and $DY_9$. The coefficients derived from the second order polynomial least-squares curve fit are such that the zero order coefficient is unused except for error checking purposes. The first order coefficient becomes $E_2$, and the second order coefficient becomes $F_2$. It will be appreciated that the zero order coefficient should be approximately equal to $DY_7$ and the $A_2$ coefficient. The difference between $DY_7$) of greater than about five galvanometer motor increments again could be indicative of questionable data.

Substep 64f indicates the computation of the $G_2$ and $H_2$ coefficients. The $G_2$ and $H_2$ coefficients are derived directly from six of the measured values in accordance with the following equations:

$$P_y = DY_3 - DY_{13}$$

$$Q_y = DY_1 - DY_{11}$$

$$R_y = DY_2 - DY_{12},$$

where, $P_y$, $Q_y$, and $R_y$ are nominally positive numbers approximately equal to the vertical width of the data field. The $G_2$ and $H_2$ coefficients can be computed from the above expressions for $P_y$, $Q_y$, and $R_y$ as follows:

$$G_2 = (P_y - Q_y)/(4 \times IX_3 \times IY_3)$$

$$H_2 = (P_y + Q_y - 2 \times R_y)/(4 \times IX_3 \times IX_3 \times IY_3).$$

The $G_2$ coefficient can be of positive or negative value, and the magnitude of $G_2$ will be typically less than $1 \times 10^{-8}$. The $H_2$ coefficient will always be negative, and the magnitude of $H_1$ will be typically about $5 \times 10^{-11}$. The equations for the $G_2$ and $H_2$ coefficients are empirically derived from the addressable field pattern having pincushion distortion in a manner analogous to that recited above with reference to FIGS. 6A–6C. It will be appreciated that substeps 64a–64c and substeps 64d–64f can be performed in parallel, as the flow diagram in FIG. 5 indicates.

Process block 66 indicates the normalizing and prescaling of the $A_1$–$H_1$ and $A_2$–$H_2$ coefficients. These operations are performed because the coefficients can be either much smaller or much greater than one. A wide range of possible coefficient values could cause an overflow condition for higher order terms because the preferred error correction processor 52 operates in 16-bit integer mathematics. To prevent such an overflow condition, the derived coefficients undergo a prescaling process that entails multiplying each term in the $X_c$ and $Y_c$ transform equations by $(32768)^n/(32768)^n$, where n represents the order of the term minus one. This prescaling process is advantageous in that it prevents the higher order terms from growing beyond 16-bits, scales up the smaller coefficient to a size that is greater than zero at 16-bits, and tends to keep intermediate products at a size yielding a maximum number of significant digits in 16-bit two's complement format.

Table I summarizes the prescaling factors computed for the coefficients.

TABLE I

| COEFFICIENTS | TYPICAL VALUES | MULTIPLIER | TYPICAL RESULTS |
|---|---|---|---|
| $A_1, A_2$ | $+/- 1000$ | 1 | $+/- 1000$ |
| $B_1, B_2$ | $+/- 1$ | 1 | $+/- 1$ |
| $C_1, C_2$ | $+/- 4 \times 10^{-8}$ | 32768 | $+/- 1.3 \times 10^{-3}$ |
| $D_1, D_2$ | $+/- 5 \times 10^{-12}$ | 1073741824 | $+/- 5.5 \times 10^{-3}$ |
| $E_1, E_2$ | $+/- 3 \times 10^{-3}$ | 1 | $+/- 3 \times 10^{-3}$ |
| $F_1, F_2$ | $+/- 30 \times 10^{-9}$ | 32768 | $+/- 1 \times 10^{-3}$ |
| $G_1, G_2$ | $+/- 1 \times 10^{-8}$ | 32768 | $+/- 3.3 \times 10^{-4}$ |
| $H_1, H_2$ | $+/- 50 \times 10^{-12}$ | 1073741824 | $+/- 5.3 \times 10^{-2}$ |

The typical results listed in the rightmost column of Table 1 indicate that after multiplication by the prescaling factor, each of the coefficients is of manageable size in fractional binary notation.

Process block 68 indicates the adjustment of certain coefficients to compensate for inherent divide-by-two operation after a multiplication has been carried out. This step is necessary because a problem exists in the organization of the Model TMC 2010 multiplier/accumulator integrated circuit manufactured by TRW, Inc. and employed in the preferred embodiment. This integrated circuit provides the result of a multiplication-/accumulation operation as two separate 16-bit words. Since this integrated circuit is chosen to operate in the fractional two's complement round mode, two 15-bit plus one sign bit numbers provide a 30-bit product and a sign bit. The lower order 16-bit output represents the lower 16 bits of the result, and the upper 16-bit output represents the upper fourteen bits of the result. The sign bit is provided as part of a separate 3-bit word. The effect of this bit arrangement is that, whenever the higher order 16-bit outputs are used, two 15-bit plus one sign bit numbers are multiplied to provide a 14-bit plus one sign bit output. A consequence of this arrangement is that the one significant bit of resolution is lost each time a product is provided or fed back to an input. This loss of data is fatal to accuracy. The problem could be avoided if it were possible to use the most significant bit (MSB) of the lower 16 bits in conjunction with the 14 bits from the upper 16 bits. Unfortunately, this cannot be done when the "round" option is selected for the multiplier because the "round" option always adds a logic 1 to the MSB of the lower 16 bits.

A solution to the problem is to use the higher order 15-bits (14-bit and one sign bit) and thereby cause an implicit divide-by-two operation on the output. This can be compensated for by premultiplying by two one of the factors one time for each multiplication operation needed to develop the term. In the preferred embodiment, this premultiplication is performed on the coefficients, provided that they remain less than one after premultiplication. The $A_1$, $A_2$, $B_1$, and $B_2$ coefficients are typically greater than one. The $A_1$ and $B_1$ coefficients are used as integer numbers and, therefore, do not suffer from the requirement that they be less than one. The $B_1$ and $B_2$ coefficients have a typical magnitude of about one. The premultiplication factor for the $B_1$ and $B_2$ coefficients is two; therefore, the magnitudes of the $B_1$ and $B_2$ coefficients are about two. Ensuring a value of less than one is accomplished by dividing the premultiplied $B_1$ and $B_2$ coefficients by three and performing the $B_1 \times X$ and $B_2 \times Y$ operations three times each. Manipulating the $B_1$ and $B_2$ coefficients in this manner accommodates unscaled values of such coefficients of up to 1.5.

Another instance in which an implicit divide-by-two operation is carried out occurs whenever error correction processor 52 recalls a previous result from a "scratch pad memory" and multiplies the result by one to deliver it to the accumulator. To compensate for the divide-by-two effect, it is necessary to recall the result from scratch pad memory twice, multiply the result by one each time and add the result to the accumulator contents.

Table II shows the pre-multiplication factors computed for each of the $A_1$-$H_1$ and $A_2$-$H_2$ coefficients. It will be appreciated that the premultiplication process and the normalization and prescaling process described with reference to process blocks 66 and 68 may be combined and performed in one operation.

TABLE II

| COEFFI-CIENTS | TYPICAL VALUES | MULTI-PLIER | TYPICAL RESULTS |
|---|---|---|---|
| $A_1$, $A_2$ | $+/- 1000$ | 2 | $+/- 2000$ |
| $B_1$, $B_2$ | 1 | 2/3 | 2/3 |
| $C_1$, $C_2$ | $+/- 1.3 \times 10^{-3}$ | 4 | $+/- 5.2 \times 10^{-3}$ |
| $D_1$, $D_2$ | $+/- 5.5 \times 10^{-3}$ | 8 | $+/- 4.4 \times 10^{-2}$ |
| $E_1$, $E_2$ | $+/- 3.0 \times 10^{-3}$ | 2 | $+/- 6 \times 10^{-3}$ |
| $F_1$, $F_2$ | $+/- 1.0 \times 10^{-3}$ | 4 | $+/- 4.4 \times 10^{-3}$ |
| $G_1$, $G_2$ | $+/- 3.3 \times 10^{-4}$ | 4 | $+/- 1.3 \times 10^{-3}$ |
| $H_1$, $H_2$ | $+/- 5.3 \times 10^{-2}$ | 8 | $+/- 4.2 \times 10^{-1}$ |

Process block 70 indicates the conversion of the coefficients from fractional binary format to a binary integer format. The coefficients produced in accordance with the processes described with reference to process blocks 66 and 68 are numbers that will be interpreted as fractional binary numbers by the multiplier/accumulator but need to be presented as binary integers for storage in the error correction processor memory. This is not true, however, for the $A_1$ and $A_2$ coefficients because they are directly stored as two's complement integers. The conversion of the $B_1$-$H_1$ and $B_2$-$H_2$ coefficients to binary integer format entails multiplying the selected coefficient by 32768, rounding the result to the nearest whole number, and storing the number as a two's complement integer in 16-bits.

Figure 7:
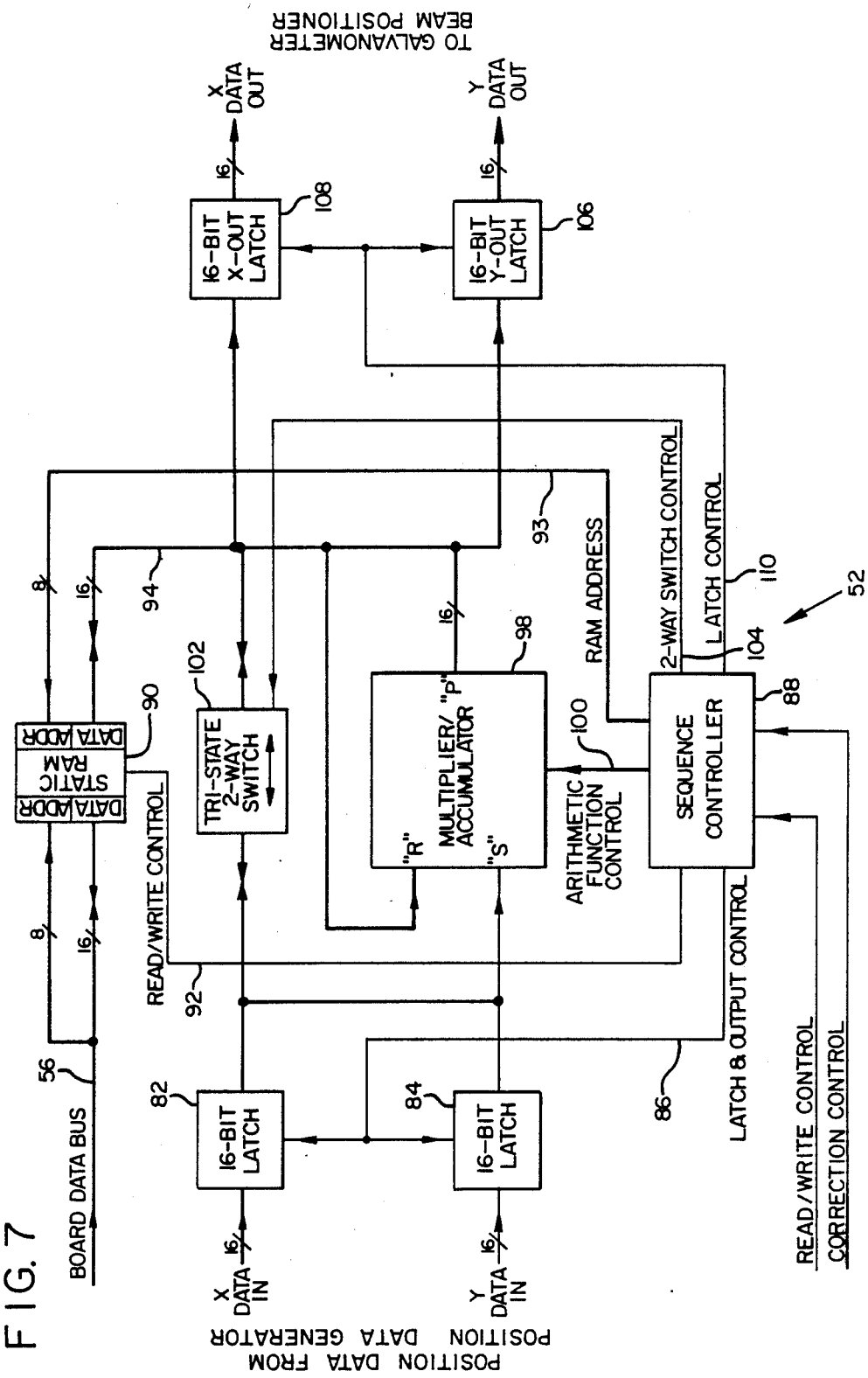
FIG. 7 is a simplified block diagram of the error correction processor implemented in the system of FIG. 3.

FIG. 7 is a simplified block diagram of error correction processor 52. With reference to FIG. 7, error correction processor 52 receives the X and Y signals in the form of 16-parallel bit digital words transmitted by way of an X input latch 82 and a Y input latch 84, respectively. The X signal data and Y signal data are stored in the respective input latches 82 and 84 at the appropriate times by a latch and output control signal provided on an output conductor 86 of a sequence controller 88. Sequence controller 88 develops the clock and timing signals in the proper sequence to coordinate and control the various functions of processor 52 to compute and accumulate the terms of the $X_c$ and $Y_c$ transform equations.

A random access memory (RAM) 90 stores the coefficients carried by data bus 56 from calibration data file 54 through system control computer 22 (FIG. 3). The coefficients are read into and read out of RAM 90 in response to a read/write control signal produced on output 92 of sequence controller 88 and an 8-parallel bit address word carried from sequence controller 88 by an address bus 93. The calibration data read out of RAM 90 appear on its output conductors and are delivered on an internal processor bus 94 to the "R" input of a multiplier/accumulator 98. Multiplier/accumulator 98 receives on its "S" input the X and Y signal data provided at different times on the outputs of the respective input latches 82 and 84. Multiplier/accumulator 98 operates in response to the arithmetic function control signals provided on outputs 100 of sequence controller 88 to multiply the data applied to the "R" and "S" inputs and to store the product in an internal "scratch pad" memory. The result of the arithmetic operations of multiplier/accumulator 98 appears on its "P" output, which is connected to processor bus 94. The "P" output and "R" input of multiplier/accumulator 98 are connected to provide an accumulator feedback path.

Processor bus 94 and the outputs of input latches 82 and 84 are connected to different inputs of a tri-state two-way switch 102. Tri-state switch 102 functions in response to a two-way switch control signal produced on output 104 of controller 88 to deliver during calibration raw X and Y position signal data from input latches 82 and 84 to output latches 106 and 108, respectively.

Sequence controller 88 provides on its outputs 86, 92, 100, and 104 control signals in the proper time sequence to deliver the X and Y signal data and coefficients to multiplier/accumulator 98 and to control its mathematical operations so that it can perform the multiplication and addition functions necessary to synthesize the $X_c$ and $Y_c$ transform equations. For example, sequence controller 88 develops the necessary signals to deliver the $B_1$ coefficient from RAM 90 and the X signal information from input latch 82 to the respective "R" and "S" inputs of multiplier/accumulator 98, which multiplies them and holds the product. Sequence controller 88 next develops the necessary control signals to deliver the $A_1$ coefficient from RAM 90 to the "R" input of multiplier/accumulator 98, which adds $A_1$ to the previously computed product, $B_1 \times X$. Error correction processor 52 has a scratch pad memory that forms a part of RAM 90. The manner in which the expansion of the terms of the transform equations is performed and the architecture of error correction processor 52 require that the scratch pad memory store only one intermediate value computed during the expansion. Error correction processor 52 can be configured, however, to store more than one intermediate value, if necessary. All other values are stored in the accumulator.

The synthesis of the $X_c$ transform equation proceeds on each term of the polynomial in an analogous manner until each of the $A_1$-$H_1$ coefficients has been read out of RAM 90 and all of the required algebraic operations have been carried out in accordance with the $X_c$ transform equation. The processing order of the terms during such synthesis is that which is most efficient without overflowing the value limits of multiplier/accumulator 98. The synthesis of the $Y_c$ transform equation is similarly carried out in an analogous manner.

The computed results appearing on the "P" output of multiplier/accumulator 98 are delivered to the inputs of the respective $X_c$ output latch 108 and $Y_c$ output latch 106, which store the $X_c$ and $Y_c$ signals in response to a store signal provided on output 110 of sequence controller 88. The $X_c$ and $Y_c$ signals appearing on the outputs of the respective output latches 106 and 108 are applied to the inputs of galvanometer beam positioner 12 (FIG. 3), which directs laser beam 14 to the commanded position on target surface 18.

Figure 8:
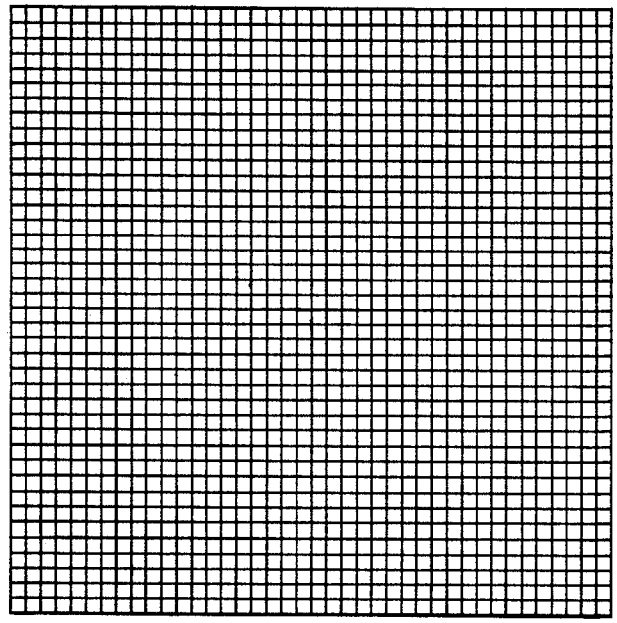
FIG. 8 is a map of an exemplary addressable field showing the effect of the position error correction techniques of the invention in eliminating beam position pincushion distortion.

FIG. 8 is a map of an exemplary addressable field 120 showing the light beam grid pattern described on target surface 18 by unit angular displacements of galvanometer mirrors 26 and 28 in response to unit changes in command data position values. FIG. 8 shows that the addressable field 120 of target surface 18 exhibits equidistant spacing of 2.5 mm between adjacent positions over virtually the entire addressable field. This is in contrast to addressable field 34 (FIG. 2) produced in accordance with the prior art. The operation of error correction processor 52 eliminates, therefore, the pincushion distortion and thereby eliminates the beam positioning nonlinearity that is characteristic of prior art light beam positioning systems.

It will be obvious to those having skill in the art that many changes may be made in the above-described details of the preferred embodiment of the present invention without departing from the underlying principles thereof. The scope of the invention should, therefore, be determined only with reference to the following claims.

We claim:

1. A light beam position error correction system employing plural optical components for directing the propagation path of the light beam in response to beam position command data, comprising:
   light source means to produce a beam of light propagating along a beam path;
   beam positioning means receiving the beam to direct its path of propagation toward a position on a target surface;
   position data generating means receiving beam position command data to generate position coordinate signals corresponding to a preselected position on the target surface; and
   error correction processing means receiving the position coordinate signals to develop compensated position coordinate signals for delivery to the beam positioning means, the compensated position coordinate signals modifying the position coordinate signals to correct for light beam positioning errors introduced by the system optical components so that the beam positioning means directs the light beam to the preselected position on the target surface, the position coordinate signals having an X signal and a Y signal that indicate the instantaneous commanded position of the light beam, and the compensated position coordinate signals include an $X_c$ signal and a $Y_c$ signal, the $X_c$ signal being a function of polynomial $$B_1X + C_1X^2 + D_1X^3 + E_1Y + F_1Y^2 + G_1XY + H_1XY^2$$

and the $Y_c$ position signal being a function of the polynomial $$B_2Y + C_2Y^2 + D_2Y^3 + E_2X + F_2X^2 + G_2XY + H_2YX^2,$$

where $B_1$, $C_1$, $D_1$, $E_1$, $F_1$, $G_1$, $H_1$, $B_2$, $C_2$, $D_2$, $E_2$, $F_2$, $G_2$, and $H_2$ represent field correction coefficients of constant values that correspond to the light directing optical properties of the system components.

2. The system of claim 1 in which the term $A_1$ is added to the polynomial of which $X_c$ is a function and the term $A_2$ is added to the polynomial of which $Y_c$ is a function, the $A_1$ and $A_2$ terms representing respective X- and Y-axis offsets in an X-Y coordinate system.

3. The system of claim 1 further comprising calibration data file means in data communication with the error correction processing means selectively to store field correction coefficients that characterize the particular light directing properties of a specific system.

4. A light beam position error correction system employing plural optical components for directing the propagation path of the light beam in response to beam position command data, comprising:
   light source means to produce a beam of light propagating along a beam path;
   beam positioning means receiving the beam to direct its path of propagation toward a position on a target surface;
   position data generating means receiving beam position command data to generate position coordinate signals corresponding to a preselected position on the target surface; and
   error correction processing means receiving the position coordinate signals to develop compensated position coordinate signals for delivery to the beam positioning means, the compensated position coordinate signals modifying the position coordinate signals to correct for light beam positioning errors introduced by the system optical components so that the beam positioning means directs the light beam to the preselected position on the target surface, the position coordinate signals having an X signal and a Y signal that indicate the instantaneous commanded position of the light beam, and the compensated position coordinate signals include an $X_c$ signal and a $Y_c$ signal, the $X_c$ and $Y_c$ signals being proportional to polynomials that include the respective terms $G_1XY$ and $G_2YX$ to correct for position errors resulting from wedge angle distortion and the respective terms $H_1XY^2$ and $H_2X^2Y$ to correct for position errors resulting from parabolic curvature distortion.

5. The system of claim 1, in which the correction coefficients are determined in accordance with a least square algorithm.

6. A light beam position error correction system employing plural optical components for directing the propagation path of the light beam in response to beam positioning command data, comprising:
   light source means to produce a beam of light propagating along a beam path;
   beam positioning means receiving the beam to direct its path of propagation toward a position on a target surface;
   system control computer means responsive to a first set of instructions to provide the beam position command data;
   position data generating means receiving the beam position command data to generate position coordinate signals corresponding to a preselected position on the target surface;
   calibration data source means providing previously acquired calibration data to correct for light beam positioning errors introduced into the system; and error correction processing means responsive to a second set of instructions to receive the position coordinate signals and the calibration data, apply the calibration data to transform the position coordinate signals into compensated position coordinate signals to correct for light beam positioning errors introduced into the system, and provide to the beam positioning means the compensated position coordinate signals so that the beam positioning means directs the light beam to the preselected position on the target surface.

7. A method of positioning a light beam, comprising:
acquiring and storing calibration data that are characteristic of the optical properties of a light beam positioning system such that the acquisition of the calibration data includes selecting an array of calibration points in an addressable field of a target surface, scanning the field until the light beam strikes each one of the calibration points, and determining the position coordinate signals required to position the light beam at the calibration points;
providing beam position command data from a system computer, the beam position command data corresponding to an intended position to which a light beam is to be directed on a target surface;
converting the beam position command data into position coordinate signals that correspond to the intended position on the target surface so that the position signals can be used by a beam positioner;
using the stored calibration data to transform the beam position command data into compensated position coordinate signals; and
providing the compensated position coordinate signals to a beam positioner to direct the light beam to the intended position on the target surface.

8. The system of claim 6 in which the compensated position coordinate signals comprise an $X_c$ signal and a $Y_c$ signal and in which the beam positioning means comprises a pair of first and second independently movable light reflecting surfaces that receive the light beam, the first and second light reflecting surfaces receiving the $X_c$ and $Y_c$ signals to move the light beam in respective first and second orthogonal directions along the target surface to position the light beam at the preselected position.

9. The system of claim 8 in which the beam positioning means further comprises a lens.

10. The system of claim 9 in which the lens is of the F-$\Theta$ type.

11. The system of claim 6 in which the light source means comprises a laser.

12. The system of claim 6, further comprising calibration data generating means to develop the previously acquired calibration data at system initialization by determining an actual beam position on the target surface and the corresponding position coordinate signals.

13. The system of claim 6, in which the beam position command data comprises a read only memory.

14. The method of claim 7, in which the compensated position coordinate signals comprise an $X_c$ signal and a $Y_c$ signal and in which the beam positioner comprises a pair of first and second independently movable light reflecting surfaces that receive the light beam, the first and second light reflecting surfaces receiving the $X_c$ and $Y_c$ signals to move the light beam in respective first and second orthogonal directions along the target surface to position the light beam at the intended position.

15. The method of claim 7, in which the light beam is generated from a laser source and in which the beam position command data is obtained from read only memory.

* * * * *

UNITED STATES PATENT AND TRADEMARK OFFICE
CERTIFICATE OF CORRECTION

PATENT NO. : 4,941,082

DATED : July 10, 1990

INVENTOR(S) : Robert M. Pailthorp et al.

It is certified that error appears in the above-identified patent and that said Letters Patent is hereby corrected as shown below:

Column 5, line 62, after "to" add --position--.

Column 6, line 1, change "divide-bytwo" to --divide-by-two--.

Column 6, line 16, change ")" to --).--.

Column 6, line 63, change ")" to --).--.

Column 7, line 14, change "64aindicates" to --64a indicates--.

Column 7, line 34, change "64bindicates" to --64b indicates--.

Column 7, line 41, change "$IY_{12}$" to --$IY_2$--.

Column 8, line 7, change "$4IX_3 \times IY_3 \times IY_3$" to --$(4 \times IX_3 \times IY_3 \times IY_3)$--.

Column 8, line 13, change "$10^{11}$" to --$10^{-11}$--.

Column 9, line 23, after "between" insert --the otherwise unused zero order coefficient and $A_2$ (or--.

Column 11, line 19, change "time" to --time,--.

Column 11, line 24, change "prescaling" to --pre-scaling--.

UNITED STATES PATENT AND TRADEMARK OFFICE
CERTIFICATE OF CORRECTION

PATENT NO. : 4,941,082

DATED : July 10, 1990

INVENTOR(S) : Robert M. Pailthorp et al.

It is certified that error appears in the above-identified patent and that said Letters Patent is hereby corrected as shown below:

Column 11, Table II, line $F_1$, $F_2$, change "4.4" to --4.0--.

Claim 1, column 13, lines 58-60, change "$G_1 X - Y$" to --$G_1 XY$--.

Claim 5, column 14, line 49, change "square" to --squares--.

Signed and Sealed this

Fifteenth Day of October, 1991

*Attest:*

HARRY F. MANBECK, JR.

*Attesting Officer*  *Commissioner of Patents and Trademarks*